United States Patent [19]

Morris et al.

[11] Patent Number: 5,408,086
[45] Date of Patent: Apr. 18, 1995

[54] HEAD-MOUNTED FLIP-UP NIGHT VISION DEVICE WITH AUTOMATIC TURN-OFF UPON FLIP-UP

[75] Inventors: Terry D. Morris, Buckeye, Ariz.; Amotz Dor, Haifa, Israel

[73] Assignee: Litton Systems, Inc., Woodland Hills, Calif.

[21] Appl. No.: 83,011

[22] Filed: Jun. 24, 1993

[51] Int. Cl.⁶ .............................................. H01J 40/14
[52] U.S. Cl. .............................. 250/214 VT; 313/524
[58] Field of Search ................ 250/214 VT, 221, 216, 250/207, 208.1; 359/353, 356; 340/825.77; 313/523, 524–530

[56] References Cited

U.S. PATENT DOCUMENTS

4,449,787  5/1984  Burbo et al. .
4,463,252  7/1984  Brennan et al. ............. 250/214 VT
4,672,194  6/1987  Kastendieck et al. .

*Primary Examiner*—David C. Nelms
*Assistant Examiner*—Que T. Le
*Attorney, Agent, or Firm*—Poms, Smith, Lande & Rose

[57] ABSTRACT

A night vision device with improved user safety includes a head gear support structure which suspends a night vision viewer relative to the head and eyes of the user. The head gear includes a flip up mount allowing the user to flip the night vision viewer up and out of the user's line of sight for an unobstructed natural view of the environment. In order both to save battery power, and to prevent the user from inadvertently revealing his position by forgetting to turn off the night vision viewer before flipping it up, the support structure includes a magnetic flux source cooperable with a magnetically-responsive switch of the night vision viewer to maintain the viewer turned on only when the viewer is in its use position. When the viewer is flipped toward its upward position, the switch of the viewer is carried out of magnetic association with the flux source so that the viewer shuts off. Because the viewer remains mounted on the flip up mount during this series of events allowing the user an unobstructed view of the environment, the viewer is immediately available to be flipped downwardly to its use position back into operative association at its switch with the flux source, and to be turned on again for night vision viewing.

31 Claims, 7 Drawing Sheets

HEAD-MOUNTED FLIP-UP NIGHT VISION DEVICE WITH AUTOMATIC TURN-OFF UPON FLIP-UP

BACKGROUND OF THE INVENTION

1. Field of the Invention

The present invention relates to night vision devices. More particularly, the present invention relates to night vision devices of the type which removably and relatively movably attach to a support structure secured to a face mask or to a helmet, for example, to thereby be supported in front of at least one eye of the user. As thus supported, the night vision device may be used by the wearer of the helmet or face mask to view a night scene while the user's hands remain free.

2. Related Technology

Conventional night vision devices are known which removably attach to a support structure secured to a helmet or face mask. These conventional night vision devices are relatively movable by manipulation of the support structure to align at least one eye piece of the night vision device with at least one eye of the user. Additionally, the support structure and night vision device are conventionally provided with cooperating structural features which insure that the night vision device is electrically deactivated when it is removed from the support structure. This conventional feature which turns off the night vision device when it is removed from the support structure prevents the battery pack of the device from being inadvertently run down by leaving the device on when it is not in use on the support structure. Also, this feature provides light security so that inadvertent light emissions do not occur.

A conventional night vision device which includes features turning off, or removing electrical power supply to, the night vision device when the latter is moved to a flipped up position is seen in U.S. Pat. No. 4,449,787, issued 22 May 1984, to James H. Burbo, et al. The teaching of the Burbo patent is believed to include the provision of a pair of recesses on a first part of the support structure attached to a helmet. A second part of the support structure is secured to the night vision device and includes a pair of pins receivable into the pair of recesses to pivotally attach and support the night vision device. Electrical contact between the night vision device and its battery pack is made through the engagement of the two parts of the support structure only when the night vision device is pivoted to its use position. Thus, when the night vision device is pivoted upwardly to allow the user unobstructed vision, power supply to the device is interrupted to save energy.

However, the support structure and electrical power interruption features of the Burbo device necessarily result in conduction of electrical power to the night vision device by way of electrical contacts which are exposed. In effect, these exposed contacts are switch contacts because they close and open in response to the pivotal movement of the night vision device between its use and flipped up positions. As a first consideration, such exposed electrical switch contacts are highly subject to damage which can interfere with the conduction of electrical power to the night vision device. Secondly, deterioration of the electrical switch contacts can result from environmental factors. That is, environmental factors may cause corrosion and other deterioration of such exposed contacts, including such undesirable effects as pitting, the formation of nonconductive oxide coatings, and the formation of other films or coatings on the exposed contacts. Of course, all of these environmental effects are detrimental to the reliable conduction of electrical power to the night vision device. The result is that such exposed electrical switch contacts compromise the service reliability of the night vision device, and cause the device to be frail instead of rugged and able to withstand the handling to which such devices are subjected in their use environment.

Another conventional night vision device is known in accord with U.S. Pat. No. 4,672,194, issued 9 Jun. 1987, to William A. Kastendieck, et al. This Kastendieck patent is believed to teach a night vision device which includes a head gear, and a night vision goggle. The goggle includes a power supply circuit having a magnetically-responsive switch in series with a bi-stable latching relay controlling power supply to the image intensifier tube of the goggle. This magnetically-responsive switch is arranged to remain closed, and to keep the power supply relay closed, so long as the switch is subjected to a sufficient magnetic flux. The head gear for the night vision device includes a permanent magnet disposed so that it is close to the magnetically-responsive switch when the goggle is on the head gear. When the goggle is removed from the head gear, the magnetically-responsive switch is moved away from the permanent magnet so that the switch opens, an electrical pulse moves the bi-stable relay to an open condition, and electrical power to the night vision goggle is interrupted. Thus, the goggle is prevented from inadvertently being left on when it is removed from the head gear and is not in use. Also, it is recognized that inadvertently leaving the night vision goggle on when it is not in use can attract the attention of hostile personnel to the phosphor green light emitted from the eyepieces of the goggle.

However, the night vision device according to the Kastendieck patent does not provide for the night vision goggle to be pivoted to a flipped up position while yet supported on the head gear. In order to obtain an unobstructed view with the unaided eyes, a user of the Kastendieck device must remove the night vision goggle from its position on the head gear in front of the user's eyes.

SUMMARY OF THE INVENTION

In view of the above, a primary object for the present invention is to provide a night vision device including a head gear support structure supporting a night vision viewer in a first position in front of at least one of a user's eyes, the night vision viewer being pivotal on the support structure to a second flipped up position above the user's eyes to provide unobstructed natural vision for the user, and the night vision viewer having electrical power supply circuitry including a magnetically-responsive switch maintaining power supply to the night vision viewer only while subjected to a sufficient magnetic flux, and the support structure including a magnet proximate to the magnetically-responsive switch only in the first position of the night vision viewer, whereby pivotal movement of said night vision viewer to the second flipped up position on the support structure causes the magnetically-responsive switch to turn off the night vision viewer.

An advantage of the present invention resides in the improved user safety resulting from automatically turning off the night vision viewer whenever it is flipped to its up position, and thereby extinguishing the green phosphor light emission from the eye piece of the night vision viewer. In this up position of the night vision viewer, the eye piece of the viewer is disposed forwardly toward possibly hostile personnel in front of the user of the night vision device. Were the night vision viewer left on, its green phosphor light emissions could provide an aiming point for hostile personnel.

Additionally, in its flipped up position, the night vision viewer is above the user's line of sight. Thus, even if a warning light were provided on the exterior of the viewer to indicate to the user that the viewer had been left on, this warning light might easily be missed by the user. Additionally, such a warning light could possibly give away the user's position even when the goggle was in its lowered use position.

Additional objects and advantages of the present invention will be apparent from reading the following description of particularly preferred exemplary embodiments of the present invention, taken in conjunction with the following drawing Figures, in which:

DESCRIPTION OF THE PREFERRED EMBODIMENTS

Figure 1:
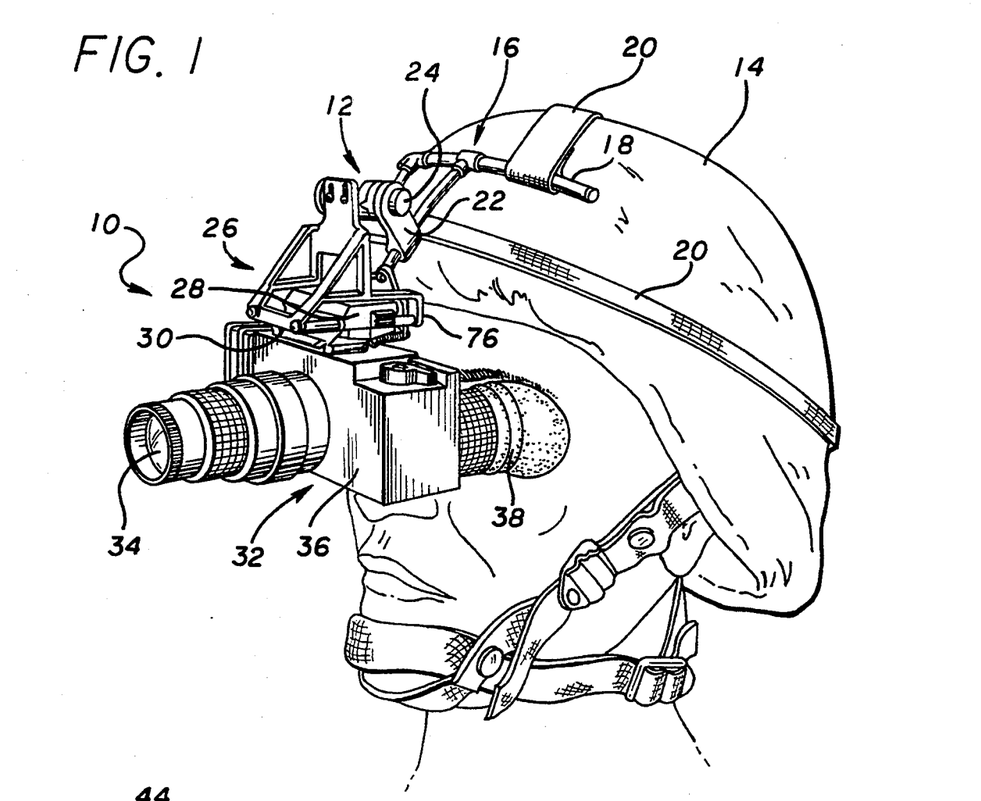
FIG. 1 provides a fragmentary perspective view of a user wearing a helmet carrying a support structure which supports a night vision viewer in front of the user's eyes.
Figure 2:
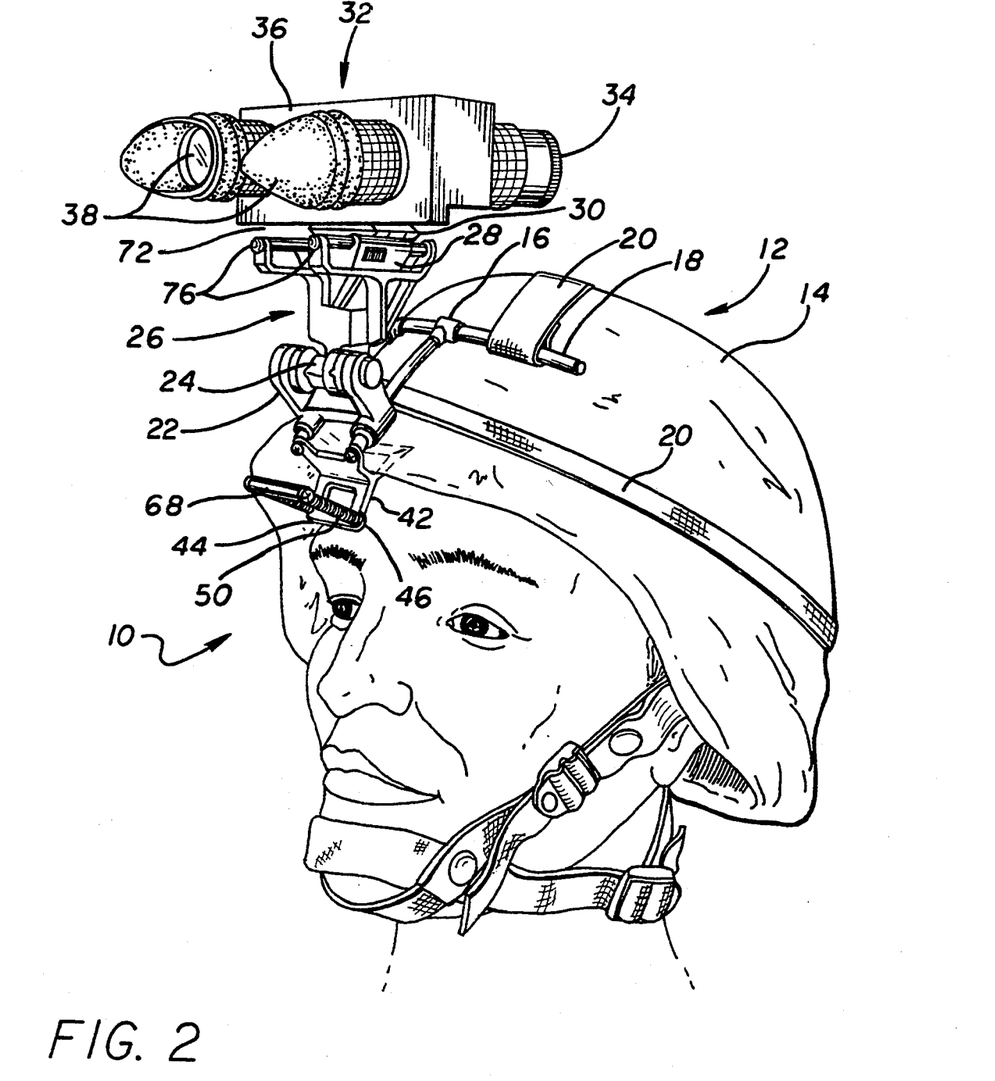
FIG. 2 is a fragmentary perspective view of the user of FIG. 1, with the night vision viewer flipped up.
Figure 3:
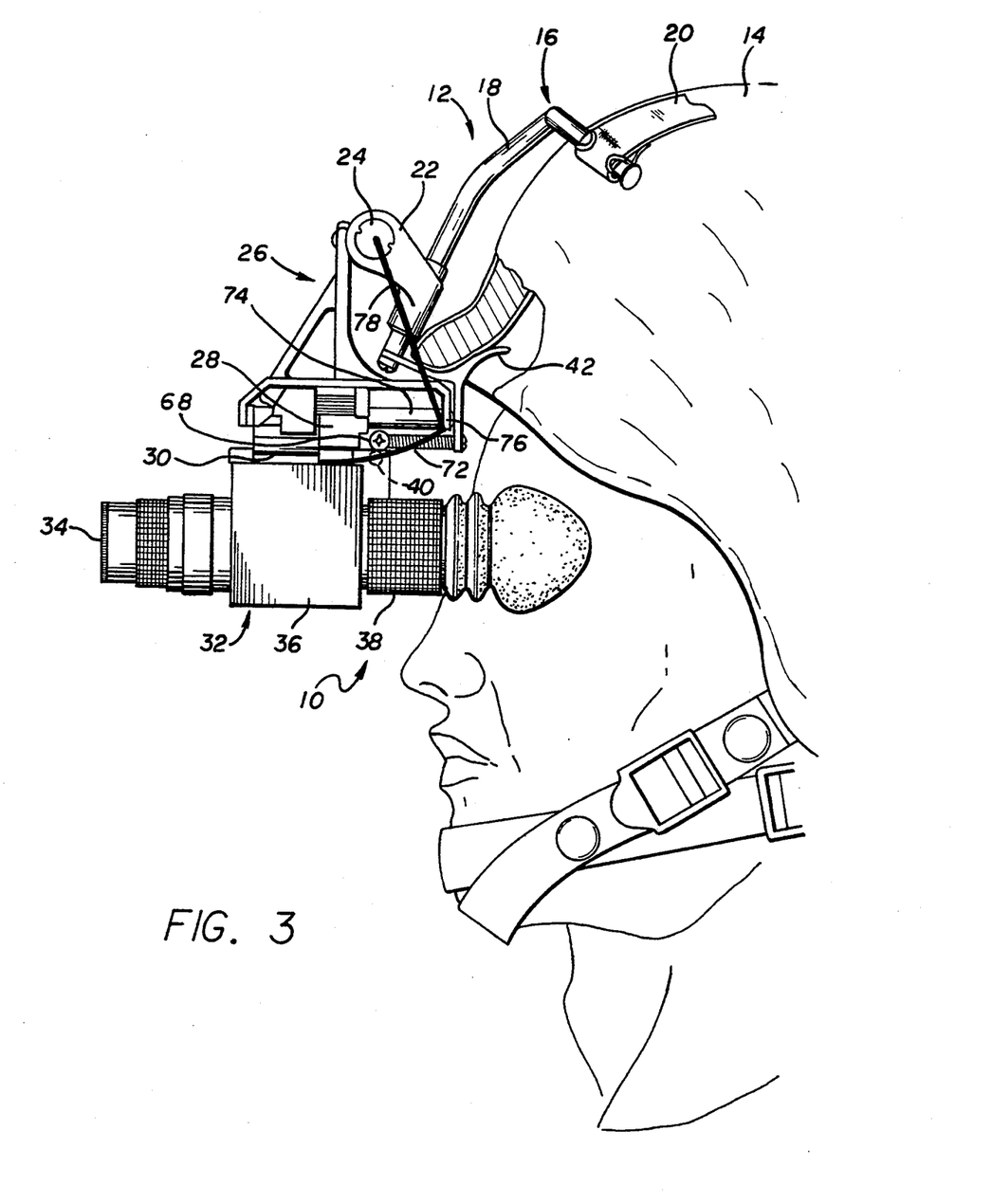
FIG. 3 is a side elevation view of the user seen in FIG. 1, at a slightly enlarged scale to better illustrate salient features of the invention.
Figure 4:
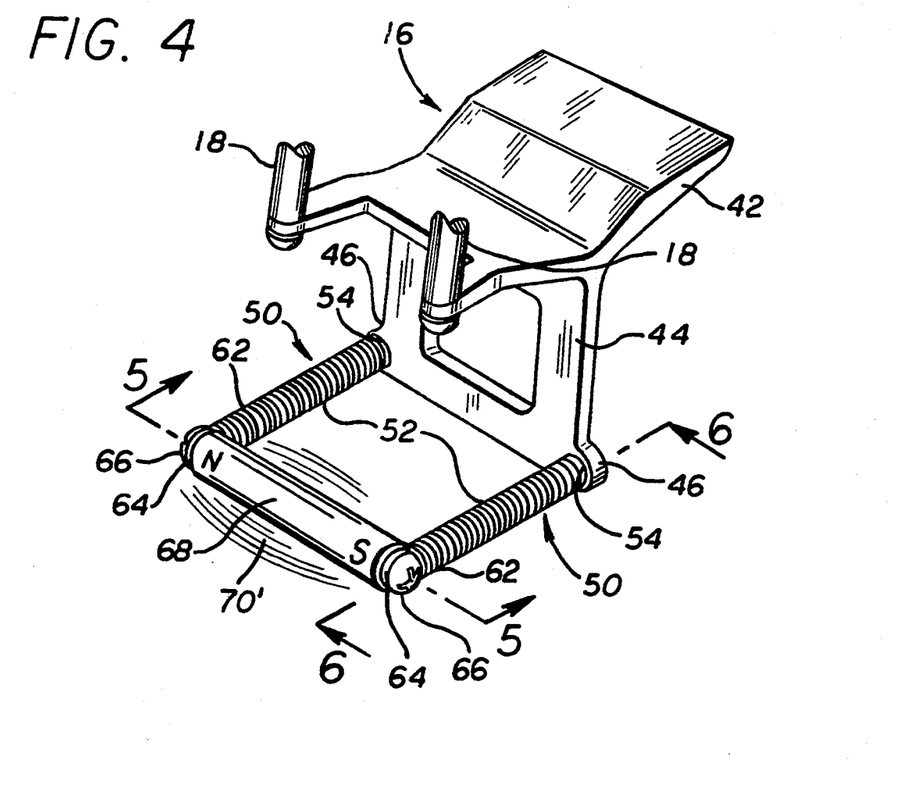
FIG. 4 is an enlarged fragmentary view of a portion of the night vision device seen in FIGS. 1–3.

Referring first to FIGS. 1, 2, and 3 in conjunction, an operator 10 is shown using a night vision device 12. The operator 10 wears a helmet 14 carrying a support structure portion 16 of the night vision device 12. This support structure 16 includes a frame 18 secured to the helmet 14 with various straps 20 and having a forwardly and upwardly extending clevis 22. The clevis 22 carries a hinge pin 24 (best seen in FIG. 2) for a flip up mount portion 26 of the support structure 16. Consequently, the flip up mount portion 26 of the support structure 16 is hinged on the clevis 22 for pivotal movement about hinge pin 24. The flip up mount portion 26 carries a carriage 28 and a coupling device 30. A night vision viewer 32 is suspended from the support structure 16 at the coupling device 30. This night vision viewer 32 is of goggle configuration and includes a single objective lens 34, a housing 36, and a pair of eye pieces 38 aligned with respective eyes of the operator 10.

To use the night vision viewer 32, the operator 10 places it in the use position depicted in FIGS. 1, and 3, and looks into eye pieces 38 to see an enhanced image representative of the low-level light from a night time scene which has entered objective lens 34. As those ordinarily skilled in the pertinent arts will appreciate, the night vision viewer 32 includes a power supply in the form of a battery pack (not visible in the drawing Figures), which may be carried on the back of the helmet 14, or carried in a breast pocket of the operator 10. This power supply is connected to the night vision viewer 32 by a power cable (also not illustrated in the drawing Figures). Internally of the night vision viewer, a power supply circuit provides power to an image intensifier tube, which is well known in the pertinent arts, and which supplies to the eye pieces 38 an intensified image in phosphor green light of the night time scene viewed via the objective lens 34. Also, the power supply circuit includes a magnetically-responsive sensor or switch, which is schematically indicated at 40 on FIG. 3. This sensor or switch 40 maintains electrical power supply to the viewer 32 once it is turned on by the operator 10 so long as a magnetic field of sufficient strength is supplied to the switch 40.

However, as is illustrated in FIG. 2, the night vision device 12 allows the operator 10 to flip up the night vision viewer 32 to a second position in which the viewer 32 is above the line of sight of the operator 10. This flipped up position of the night vision viewer allows the operator completely unobstructed vision with unaided eyes. As FIG. 2 clearly shows, however, should the operator 10 forget to turn off the night vision viewer 32 before moving it to its flipped up position, the phosphor green light emitted from the eyepieces 38 would appear to possibly hostile personnel forwardly of the operator 10 as a pair of small green spot lights.

Accordingly, in order to provide the necessary magnetic flux to the switch 40 while at the same time insuring that the magnetic field is removed from the switch 40 when the viewer 32 is pivoted to its flipped up position while still attached to the support structure 16, the latter includes a bracket 42 which hooks under the forward edge of the helmet 14 (best seen in FIGS. 2 and 3). From the bracket 42 depends a flange portion 44, viewing FIGS. 2–6 in conjunction. A pair of laterally spaced apart ears 46 extend oppositely from the flange portion 44 and define respective forwardly extending bores 48 (seen in FIG. 6).

Figures 5, 6:
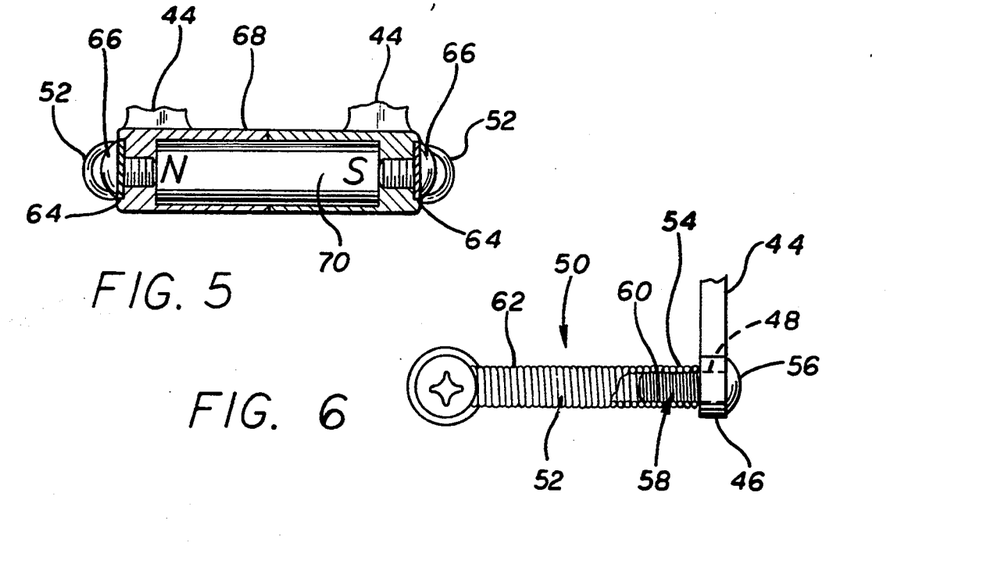
FIG. 5 is a fragmentary cross sectional view taken along line 5—5 of FIG. 4.
FIG. 6 is a fragmentary side elevation view taken at line 6—6 of FIG. 4.

Forwardly from the ears 46 extends a laterally spaced apart pair of yieldable, but shape-retaining support arms 50. The arms 50 are formed of small diameter closed-coil metallic springs 52. At their rear ends 54, the coil springs 52 each threadably receive a respective one of a pair of screw members 56. These screw members 56 have a stem portion 58, as is seen in FIG. 6, which is of a diameter receivable into the spring 52, and defining a screw thread 60 matching the closed-coil helix of this spring. At a forward end 62, each support arm coil spring 52 defines a termination coil 64 which is turned ninety degrees from the remainder of the coil spring to extend forwardly of the support structure 16.

Viewing FIGS. 2–6, and particularly FIG. 5, it is seen that termination coils 64 of the support arm coil springs 52 each receive a respective screw 66 capturing the termination coils 64 against respective ends of a laterally elongate magnet housing 68. Within this magnet housing 68 is disposed a laterally elongate and laterally polarized magnet 70, the magnetic field from which is depicted on FIG. 4 with the numerals 70'.

FIG. 3 illustrates that in the use position of the night vision viewer 32, the magnet housing 68 is located in a recess 72 rearwardly of the coupling device 30, below carriage ways 74 for the carriage 28, and above the housing 36 proximate to the location of switch 40. Thus, when the night vision viewer is located in its use position, as illustrated in FIGS. 1 and 3, the magnetic field 70' from the magnet 70 insures that the viewer 32 remains on once the operator 10 turns it on.

However, when the operator 10 flips up the viewer 32 to its flipped up position depicted in FIG. 2, the yieldable nature of the support arms 50 allows these arms to yield and allow a rearward portion 76 of the flip up mount 26 (seen in FIG. 3) to swing along the arc denoted by the line 78 from the hinge pin 24, past the arms 50 and magnet housing 68. As is easily understood, once the housing 36 of the night vision viewer 32 is a comparatively short distance from its use position along the pivotal movement toward its flipped up position, the magnetic field 70' can not influence switch 40, and the latter effects a shut off of the viewer 32. Consequently, by the time the viewer 32 reaches its flipped up position depicted in FIG. 2, the phosphor green light from the eye pieces 38 has been extinguished.

Thus, the user 10 enjoys a much improved safety in the use of the night vision device 10, while still enjoying the convenience in use which is afforded by a flip up mount. That is, the night vision viewer 32 is immediately available for its next use simply by flipping it down from the position of FIG. 2 to the use position illustrated by FIG. 1. The user 10 need not remove the night vision viewer 32 from its support structure in order to have clear, unobstructed vision with the unaided eyes. Further, the operator 10 need not remember to turn off the viewer 32 each time a view with the unaided eyes is desired. Simply moving the viewer 32 up to its flipped up position will safely extinguish the phosphor green illumination from the eye pieces 38, as well as saving battery power by turning off the viewer 32.

Upon the operator 10 returning the viewer 32 to its flipped down use position, the yieldable nature of the arms 50 allows the rearward portion 76 of the flip up mount 26 to contact the magnet housing 68, and to force this housing and the arms 50 downwardly. Thus, the flip up mount 26, and the housing 36 of viewer 32 can return to their positions illustrated in FIG. 1 and 3. The magnet housing 68 thus returns to the recess 72. In this use position of the viewer, when the operator 10 turns on the viewer 32, the magnetic field 70' by its influence on the switch 40 insures that the viewer stays on until the operator 10 turns it off, or flips it upwardly toward its flipped up position.

Figure 7:
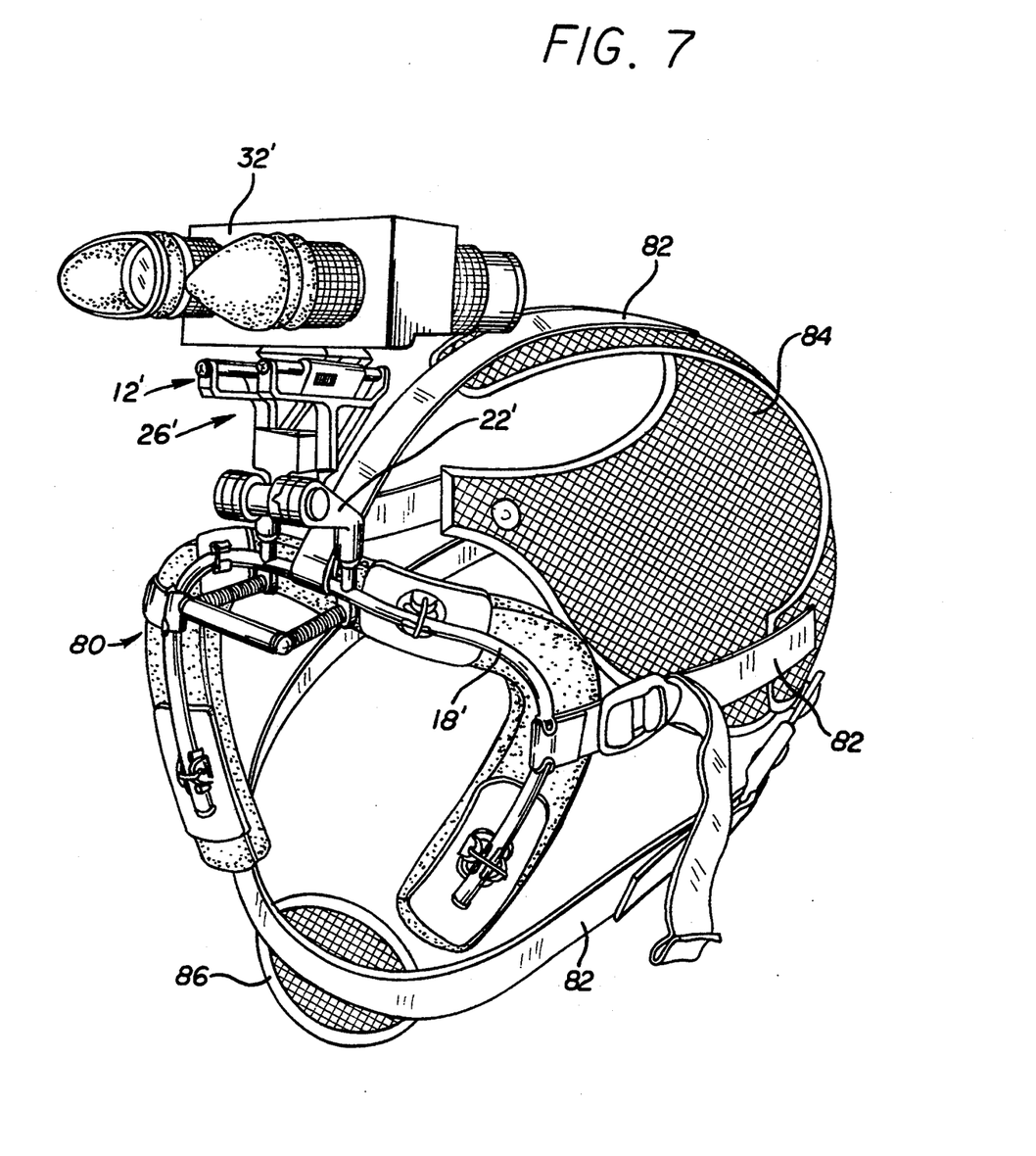
FIG. 7 is a fragmentary perspective view similar to that of FIG. 3, but showing an alternative embodiment of the invention which includes a face mask support structure for the night vision viewer.
Figure 8:
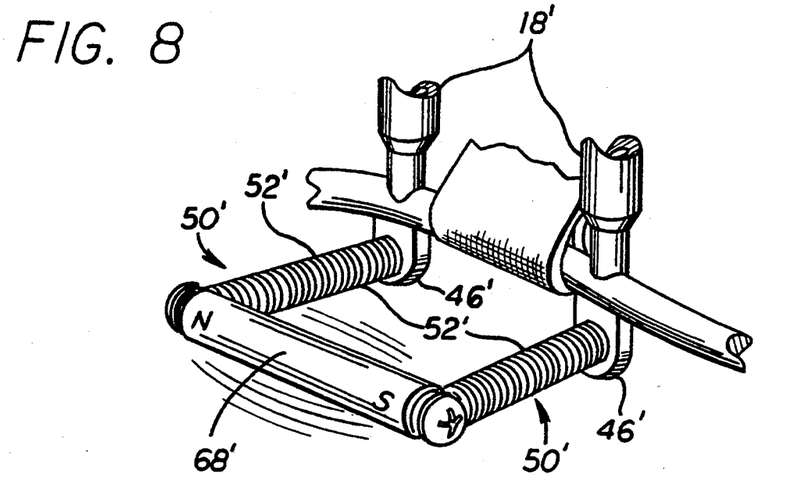
FIG. 8 is a fragmentary perspective view of a portion of the inventive night vision device seen in FIG. 7.

FIGS. 7 and 8 depict an alternative embodiment of the present invention. In order to obtain reference numerals for use in describing the embodiment of FIGS. 7 and 8, features which are analogous in structure or function to those depicted and described above are referenced with the same numeral used previously, but with a prime added thereto. Viewing FIGS. 7 and 8 in conjunction, it is seen that a night vision device 12' may be supported on a face mask 80. This face mask 80 may be secured to the head of an operator by use of a plurality of straps, mesh panels, and a chin piece, respectively indicated with the numerals 82, 84, and 86. In the present instance, the face mask 80 carries a frame 18', which includes a forwardly and upwardly extending clevis 22'. On the clevis 22' is carried a flip up mount 26', in all respects the same as the flip up mount 26 described with reference to FIGS. 1–6. This flip up mount 26' carries a night vision viewer 32'.

However, viewing FIGS. 7 and 8, and particularly the latter one of these two Figures, it is seen that the frame 18' carries a pair of laterally spaced apart and depending ears 46'. Forwardly from these ears 46' extends a pair of yieldably shape retaining arms 50', which are embodied as closed coil springs 52'. A laterally extending magnet housing 68' is supported at the forward ends of the arms 50', for interaction with a switch 40' (not depicted in the drawing Figures) of the night vision viewer 32', just as described above with respect to FIGS. 1–6.

Figure 9:
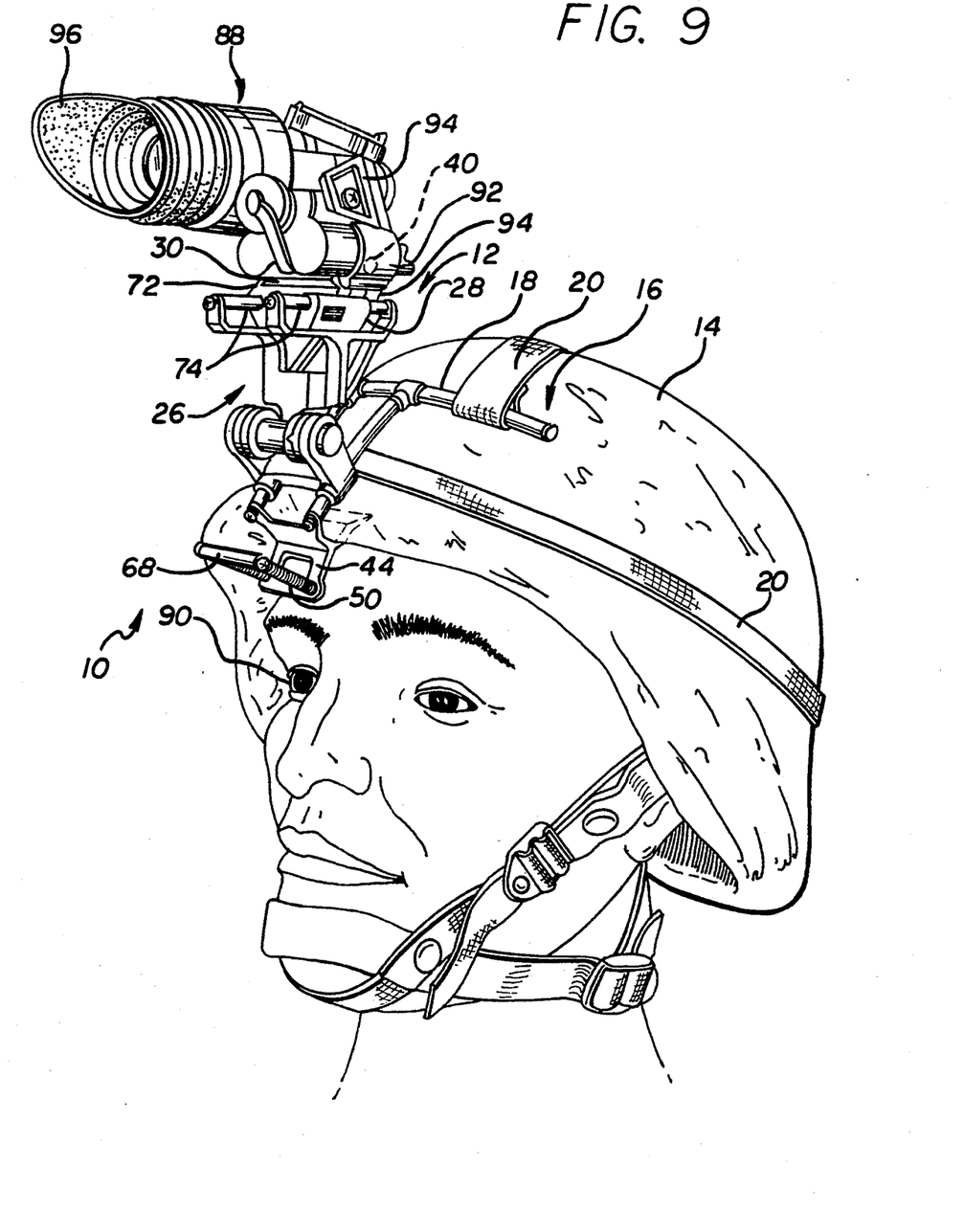
FIG. 9 provides a fragmentary perspective view of yet another alternative embodiment of the inventive night vision device, in which the night vision viewer is of monocular type.

FIG. 9 depicts yet another embodiment of the present invention. The embodiment of FIG. 9 is the same in all respects with the embodiment described with reference to FIGS. 1–6, except that the night vision viewer 88 is of a monocular configuration. Accordingly, those features which are familiar because of their introduction and description with reference to FIGS. 1–6 are referenced on FIG. 9 with the same numerals used above. Considering now FIG. 9 it is seen that the operator 10 has configured the night vision viewer 88 to be used with the right-hand eye 90 of the operator. That is, the viewer 88 includes a triangular housing 92 having a pair of dove tailed receptacle 94, one on each of two faces thereof. One of the dove tailed receptacles 94 is received in the coupling device 30 of the flip up mount 26, while the other dove tailed receptacle is not utilized in the depicted configuration of the night vision viewer.

Because of the angulation between the dove tailed receptacles 94, when the depicted one is inserted in the coupling device 30, the viewer hangs in front of the right-hand eye of the operator 10. On the other hand, if the other receptacle 94 is inserted in the coupling device 30, the viewer hangs in front of the left-hand eye of the operator 10. The viewer 88 includes a rotational eye piece shield 96. This shield 96 allows the operator 10 to shield the eye with which the viewer is being used. Accordingly, the embodiment of FIG. 9 allows the operator to have one eye aided by the night vision viewer 88, while the other eye receives an unaided view of the environment around the operator. This combination of night vision and unaided vision has been found to be very beneficial in some circumstances.

As noted on FIG. 9, regardless of which of the dove tailed receptacles 94 is inserted into the coupling device 30, the housing 92 cooperates with the carriage ways 74 to define a recess 72 in which the magnet housing 68 is received. In contrast to the embodiment of FIGS. 1–6 however, the monocular night vision viewer of FIG. 9 includes a magnetically-responsive switch 40 which is offset within the housing 92. This switch is depicted with the dashed lines 98 on FIG. 9. Because of its offset location at the apex of the two sides of housing 92 carrying the mounts 94 this switch is effective to turn off the night vision viewer 88 when it is separated by a sufficient distance from the magnet housing 68, as described above. Thus, regardless of which one of the two possible orientations of the viewer 88 on the coupling device 30 is chosen by the operator 10, the safety advantage of the present invention is fully enjoyed.

Figure 10:
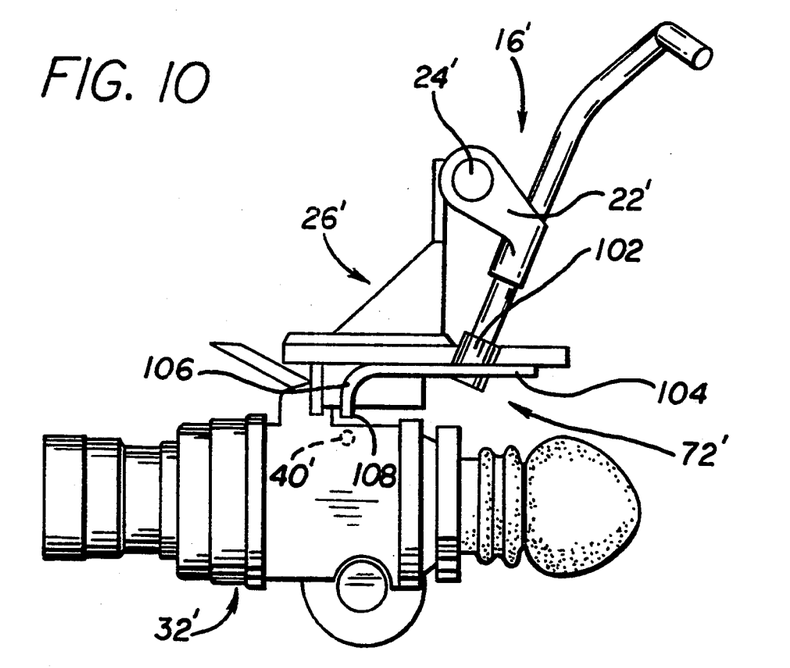
FIGS. 10 and 11 provide fragmentary side elevation views of still another alternative embodiment of the present inventive night vision device in which the night vision viewer is of goggle type with a singular objective lens.
Figure 11:
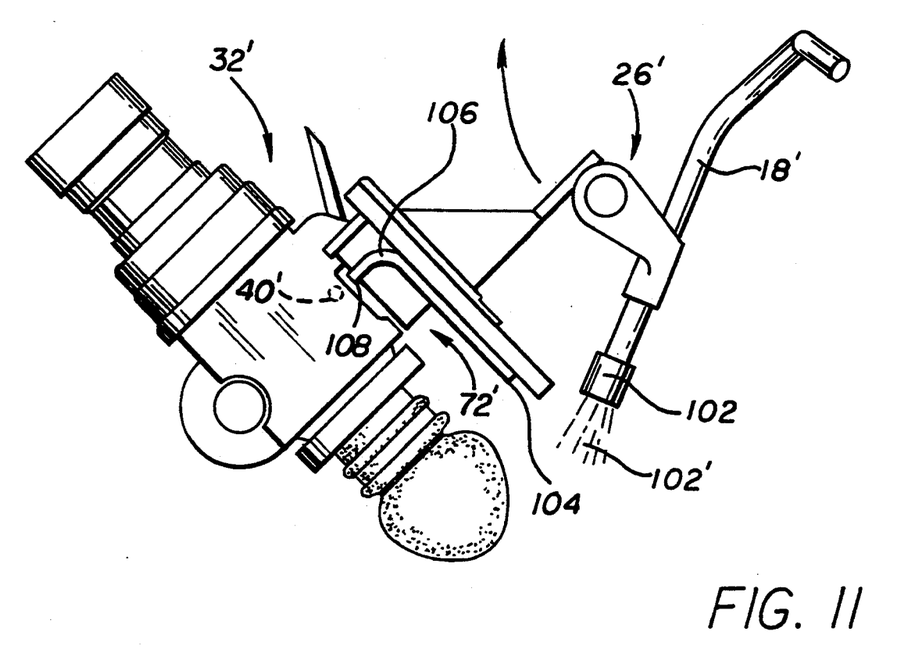

Still another embodiment of the present invention is depicted in FIGS. 10 and 11. Again, features of FIGS. 10 and 11 which are analogous in structure or function to those depicted and described above with reference to FIGS. 1–6 are referenced with the same numeral used above, and having a prime added thereto. As is shown in FIG. 10, a support structure 16' may be supported from the head of a operator (not shown) to dispose a goggle type of night vision viewer 32' in front of the eyes of the operator. The support structure 16' includes a clevis 22' to which a flip up mount 26' is hinged at 24'. The night vision viewer 32' includes a magnetically responsive switch 40'.

However, the frame 18' includes a cylindrical magnet housing 102 presenting magnet flux 102', as is best seen in FIG. 11. On the flip up mount 26', a forwardly extending magnetic flux conductor 104 extends into the recess 72' and includes a downwardly turned end portion 106 terminating at an end 108 adjacent to the magnetically responsive switch 40'. The magnetic flux conductor 104 is metallic, and preferably is formed of an alloy known as Permador, supplied by the Carpenter Steel Company. The Permador alloy has a high magnetic flux permeability, while retaining a very low residual magnetism when not supplied with magnetic flux from an external source.

Consequently, when the viewer 32' is in its use position depicted in FIG. 10, the flux conductor 104 is closely associated with magnet housing 102 to receive the magnetic flux 102'. The end 108 is adjacent to the switch 40' so that this switch maintains the viewer turned on. However, as FIG. 11 shows, when the flip up mount 26' with the viewer 32' is moved toward its flipped up position, the conductor 104 is separated from the magnet housing 102. The result is that the switch 40' turns off the viewer 32' as described above.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. For example, the magnetically responsive switch 40 need not itself take the form of a switch. That is, for example, a magnetically responsive semiconductor device or sensor could be substituted for the switch 40 and could be used to effect a power interruption to the viewer 32 when the magnetic field effective on the sensor drops to a predetermined level indicative of pivotal movement of the viewer toward its flipped up position. Accordingly, the depicted and described preferred embodiments of the invention are exemplary only, and are not exhaustive of the scope of the invention. Consequently, the invention is intended to be limited only by the spirit and scope of the appended claims, giving full cognizance to equivalents in all respects.

We claim:

1. A night vision device comprising:
 a head gear support structure supported on a user's head and supporting a night vision viewer in a first position in front of at least one of the user's eyes, the night vision viewer being movable on the support structure to a second position allowing the user natural vision unobstructed by the night vision viewer;
 a magnetically responsive switch carried by the night vision viewer and responsive to magnetic flux to maintain said viewer turned on;
 a magnetic flux source carried by said support structure and in said first position of said viewer being proximate to said switch to maintain said viewer turned on, movement of said viewer to said second position on said support structure separating said flux source from said switch to turn off the night vision viewer.

2. The night vision device of claim 1 wherein said support structure includes a flip up mount hingably carrying said night vision viewer for pivotal movement between said first and said second positions.

3. The night vision device of claim 2 wherein said night vision viewer and said flip up mount in said first position cooperatively define a recess opening toward said support structure, said magnetically responsive switch being disposed adjacent said recess.

4. The night vision device of claim 3 wherein said magnetic flux source is disposed in said recess.

5. The night vision device of claim 4 wherein said support structure includes an arm extending forwardly into said recess, said arm at a forward end thereof supporting a magnet in said recess adjacent to said magnetically responsive switch.

6. The night vision device of claim 5 including a pair of said arms laterally spaced apart and extending forwardly into said recess, said pair of arms cooperatively supporting a laterally extending magnet therebetween.

7. The night vision device of claim 6 wherein said pair of arms cooperatively support an elongate magnet housing therebetween, said magnet housing carrying said magnet.

8. The night vision device of claim 5 wherein said arm is yieldably shape retaining, said arm being engaged by a portion of said flip up mount as the latter moves between said first position and said second position and yielding to allow said flip up mount to move between said positions.

9. The night vision device of claim 8 wherein said arm includes a closed coil metallic spring, said spring being secured at an aft end thereof to said support structure, and a forward end of said spring supporting said magnet.

10. The night vision device of claim 3 wherein said magnetic flux source is carried by said support structure outwardly of said recess, and a magnetic flux conductor in said first position extending from said magnetic flux source to a position proximate to said switch, said magnetic flux conductor conducting magnetic flux from said source to said switch to maintain said viewer turned on in said just position.

11. The night vision device of claim 10 wherein said magnetic flux conductor is carried by said flip up mount to separate from said magnet flux source in response to movement of said viewer to said second position.

12. The night vision device of claim 11 wherein said magnetic flux conductor is magnetically permeable metal.

13. The night vision device of claim 12 wherein said magnetically permeable metal in Permador alloy.

14. The night vision device of claim 11 wherein said magnetic flux conductor includes an aft end proximate to said magnetic flux source in said first position of said night vision viewer, said flux conductor extending forwardly into said recess to a forward downturned end portion terminating at an end which is adjacent to said magnetically responsive switch.

15. A method of improving user safety of a night vision device including a support structure supported on the user's head and supporting a night vision viewer in a first position in front of at least one eye of the user, the night vision viewer being pivotal upwardly to a second position affording the user with natural vision unobstructed by said night vision viewer, the night vision viewer including a magnetically responsive switch which maintains said viewer turned on when supplied with sufficient magnetic flux, said method comprising the steps of: associating a magnetic flux source with said support structure so that said switch and flux source are in proximity to one another in said first position; and separating said switch from said flux source in response to pivotal movement of said viewer to said second position on said support structure.

16. The method of claim 15 further including the steps of configuring said support structure to have a support frame supported on the user's head, providing said support frame with a flip up mount, supporting said night vision viewer on said flip up mount, moving the flip up mount and night vision viewer together to said second position, and associating said flux source with said support frame so that said night vision viewer moves away from said flux source toward said second position.

17. The method of claim 16 wherein said associating step includes providing an arm at one end supported on said support frame and at an opposite end carrying said flux source.

18. The method of claim 17 including the step of configuring said arm to be yieldable, and yielding said arm to allow pivotal movement of said flip up mount between said first and said second positions.

19. The method of claim 18 wherein said configuring step includes the step of using a closed-coil metallic spring to define at least a portion of said arm.

20. The method of claim 15 further including the step of using a permanent magnet as said flux source.

21. A night vision device comprising a support structure including a support frame supporting on the head of a user, said support frame carrying a forwardly and upwardly extending clevis;

a flip up mount hingably securing to said clevis for pivotal movement between a first position extending forwardly above said user's eyes, and a second position extending upwardly of said clevis;

said flip up mount including a coupling device for securing a night vision viewer to said flip up mount so that said viewer is suspended in front of at least one eye of said user in said first position, and in said second position said viewer does not obstruct the user's natural vision, said viewer including a magnetically-responsive switch maintaining said viewer turned on when said switch is subjected to a sufficient magnetic flux;

and said frame carrying a magnetic flux source with respect to which said flip up mount is relatively movable, said magnetic flux source being operatively associated with said magnetically-responsive switch in said first position to maintain said viewer turned on, and said flip up mount carrying said viewer and switch away from said flux source toward said second position to effect turning off said viewer.

22. The night vision device of claim 21 wherein said support frame secures to a helmet worn by said user.

23. The night vision device of claim 21 wherein said support frame secures to a face mask worn by said user.

24. The night vision device of claim 21 wherein said support frame carries an arm supporting said magnetic flux source adjacent said switch in said first position.

25. The night vision device of claim 24 wherein said arm is yieldably shape retaining.

26. The night vision device of claim 25 wherein said yieldably shape retaining arm includes a closed-coil metallic spring.

27. The night vision device of claim 24 wherein said support frame carries a laterally spaced apart pair of arms cooperatively supporting said flux source.

28. The night vision device of claim 21 wherein said magnetic flux source includes a permanent magnet.

29. The night vision device of claim 21 wherein said support frame immovably carries said magnetic flux source, said flip up mount carrying a magnetic flux conductor associated with said magnetically-responsive switch, said flux conductor in said first position operatively associating with said flux source to receive magnetic flux which is conducted to said switch to maintain said viewer turned on, and said flip up mount carrying said flux conductor out of association with said flux source as said mount pivots toward said second position to effect turning off of said viewer.

30. The night vision device of claim 29 wherein said flux conductor is formed of a highly permeable magnetic metal with low residual magnetism.

31. The night vision device of claim 30 wherein said flux conductor is formed of Permador alloy metal.

* * * * *